United States Patent [19]
Retallick

[11] Patent Number: 4,765,047
[45] Date of Patent: Aug. 23, 1988

[54] METHOD OF MAKING A METAL HONEYCOMB CATALYST SUPPORT HAVING A DOUBLE TAPER

[75] Inventor: William B. Retallick, West Chester, Pa.

[73] Assignee: W. R. Grace & Co.-Conn., New York, N.Y.

[21] Appl. No.: 23,700

[22] Filed: Mar. 9, 1987

Related U.S. Application Data

[62] Division of Ser. No. 905,071, Sep. 8, 1986, Pat. No. 4,673,553.

[51] Int. Cl.⁴ .............................................. B21D 53/02
[52] U.S. Cl. .................................... 29/157 R; 72/379; 228/183; 422/180; 502/527
[58] Field of Search ............... 29/157 R; 72/187, 196, 72/379; 228/183; 422/180, 222; 502/527

[56] References Cited

U.S. PATENT DOCUMENTS

| | | | |
|---|---|---|---|
| 2,526,657 | 10/1950 | Guyer | 502/527 X |
| 2,765,164 | 10/1956 | Hand | 493/433 |
| 4,576,800 | 3/1986 | Retallick | 422/180 |
| 4,647,435 | 3/1987 | Nonnenmann | 422/180 |

FOREIGN PATENT DOCUMENTS

| | | | |
|---|---|---|---|
| 2201881 | 7/1973 | Fed. Rep. of Germany | 502/527 |
| 3341868 | 5/1985 | Fed. Rep. of Germany | 422/180 |

*Primary Examiner*—P. W. Echols
*Assistant Examiner*—Andrew E. Rawlins
*Attorney, Agent, or Firm*—Steven T. Trinker

[57] ABSTRACT

A catalytic converter includes a metal honeycomb catalyst support which is anchored in a canister so that it cannot telescope or blow out. The honeycomb catalyst support is made by folding a strip of metal back and forth upon itself. The lines of folding are inclined to the perpendicular to the axis of the strip. The repeating sequence of the inclinations is left, right, right, left, etc. Folding the strip in this manner produces a honeycomb that has a taper in both of two directions so that it can be anchored in the canister. The canister has a taper which coincides with the taper of the honeycomb. The invention also includes a method and apparatus for making crease lines on the strip, so that the strip can be folded.

6 Claims, 5 Drawing Sheets

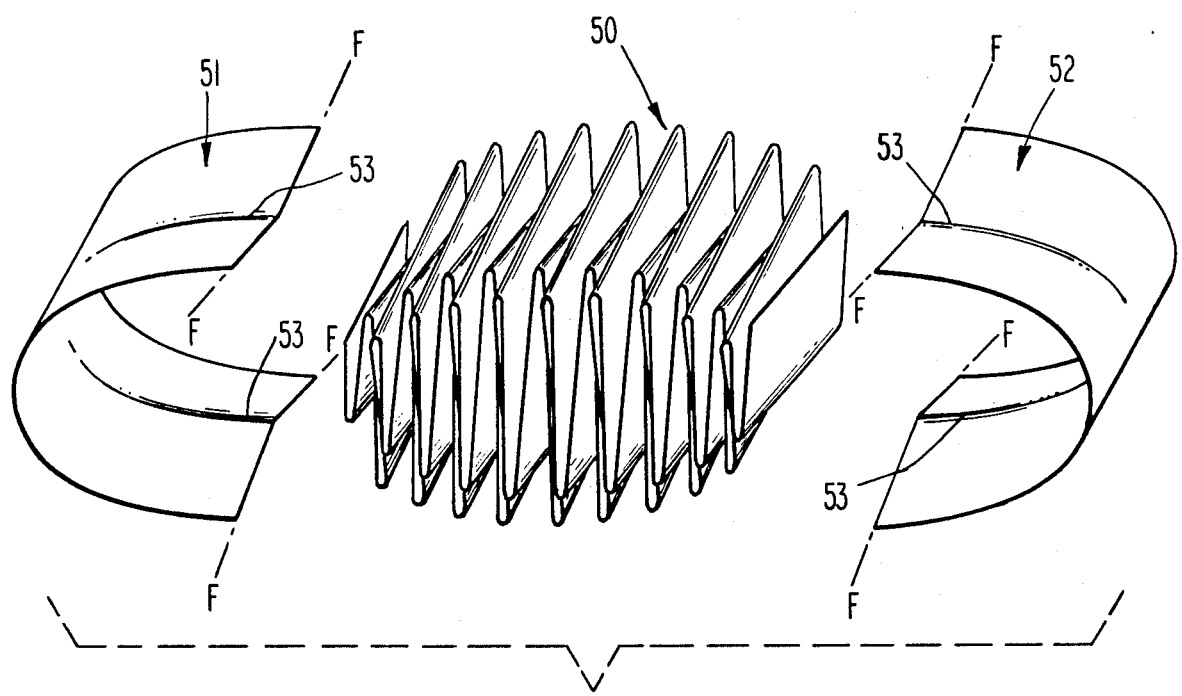
_Fig. 9_
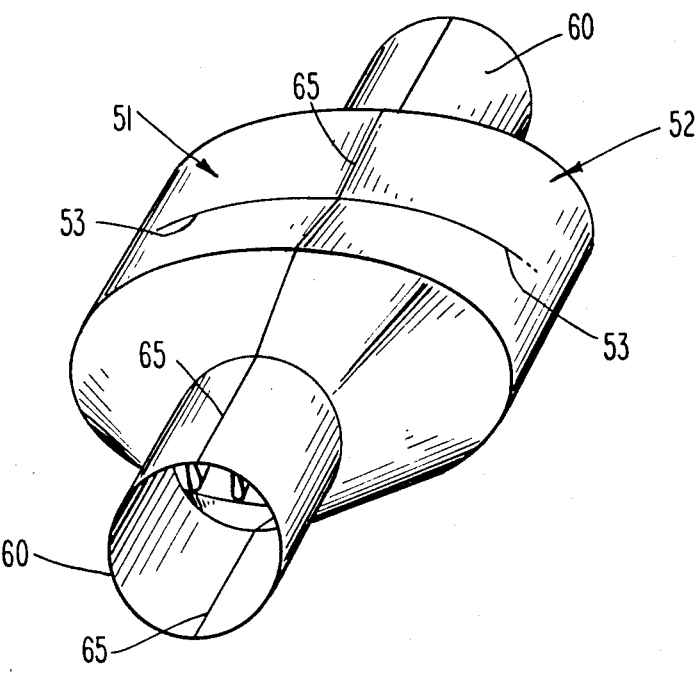
_Fig. 10_

METHOD OF MAKING A METAL HONEYCOMB CATALYST SUPPORT HAVING A DOUBLE TAPER

This is a division of application Ser. No. 905,071, filed Sept. 8, 1986 now U.S. Pat. No. 4,673,553 issued June 16, 1987.

BACKGROUND OF THE INVENTION

The present invention relates to the field of metal honeycomb catalyst supports, and especially those catalyst supports which are used in automobiles.

One way to make a metal honeycomb catalyst support is to lay a corrugated strip of metal on a flat strip of metal, and to wind the two strips upon themselves to make a spiral. Spiral-wound catalyst supports have a fatal shortcoming when they are used in catalytic converters for automobiles: they telescope outwardly under the pulsating flow of the engine exhaust. A method that has been used to prevent the telescoping consists of brazing together the layers of the spiral over a short length of spiral, at both ends of the spiral. This method is expensive, and moreover, it restricts the metal alloy of the spiral to metals that can be brazed. Such alloys do not always make satisfactory catalyst supports.

Another way to make a honeycomb is to fold a strip of metal back and forth upon itself. My U.S. Pat. No. 4,576,800, the disclosure of which is incorporated by reference herein, describes such a honeycomb. A plurality of slots are punched in the metal strip, at predetermined intervals. The slots define lines across the width of the strip, and the strip is folded along these lines. If the intervals between the lines of slots are calculated correctly, the face of the honeycomb will have the desired shape, such as a circle or an ellipse, which is commonly used for automobile converters. When the strip is folded, the slots form notches. The notches together define grooves which mate with ridges in the canister, thereby preventing the layers of the honeycomb from telescoping.

The catalytic converter described above has disadvantages due to the need to punch slots in the metal strip. The metal strips used in catalytic converters are typically very thin, of the order of 0.0015–0.003 inches. When the strip is this thin, the tolerance on the punch and die that forms the slots is measured in tenths of thousandths of an inch. Only a small amount of wear makes the punch and die inoperative.

The present invention provides an improved structure for a catalytic converter for an automobile. The invention provides a converter made of a folded metal strip which is firmly anchored within its canister, and having layers which cannot telescope outwardly. The invention is adapted to economical, high-speed mass production, and eliminates the need for a punch and die.

SUMMARY OF THE INVENTION

The catalytic converter of this invention is made by folding a strip of metal back and forth upon itself to form a honeycomb catalyst support. The spacing between the layers in the honeycomb is maintained by corrugations in the strip, such as described in U.S. Pat. Nos. 4,576,800 and 3,183,963. Each fold is made upon a crease line that extends across the width of the strip. The crease lines are inclined to the perpendicular to the axis of the strip. The direction of inclination, relative to the perpendicular, is varied in a repeating sequence. As a result, the honeycomb made by folding the strip has a taper in both of two directions so that the honeycomb can be anchored in its canister.

The creases are formed by passing the strip between rollers. One roller has a ridge that mates with a groove on the other roller. The ridges and grooves are not parallel to the axes of the rollers, but instead they define spirals on the surfaces of the rollers. When the rollers are pressed against the metal strip, the spiral ridges form creases in the strip, and the creases appear as straight lines inclined to the perpendicular to the axis of the strip.

It is therefore an object of the invention to provide a catalytic converter for an automobile, wherein the converter comprises a metal honeycomb catalyst support anchored in a canister.

It is another object to provide a catalytic converter as described above, wherein the catalyst support cannot telescope or blow out.

It is another object to provide a catalytic converter as described above, wherein the catalyst support can be made from a single strip of metal folded back and forth upon itself.

It is another object to provide a catalytic converter as described above, wherein the strip is free of perforations.

It is another object to provide a prepared metal strip which, upon being folded back and forth upon itself, becomes a multi-layer honeycomb catalyst support having a predetermined cross-section.

It is another object to provide apparatus for creasing the strip for folding.

It is another object to improve the efficiency and reliability of apparatus used to make a catalytic converter.

It is another object to eliminate the punch and die formerly required in the manufacture of catalytic converters.

It is another object to provide a method for making the catalytic converter described above, the method being adapted to high speed mass production.

Other objects and advantages of the invention will be apparent to those skilled in the art, from a reading of the following brief description of the drawings, the detailed description of the invention, and the appended claims.

BRIEF DESCRIPTION OF THE DRAWINGS

FIG. 9 is an exploded perspective view of a honeycomb catalyst support, showing a metal strip folded into a generally elliptical cross-section, and the canister which encloses the strip.

FIG. 10 is a perspective view of the completed catalytic converter made according to the present invention.

DETAILED DESCRIPTION OF THE INVENTION

The catalytic converter of this invention is made by folding a strip of metal back and forth upon itself to form a honeycomb catalyst support. The spacing between the layers in the honeycomb is maintained either by indentations in the strip, or by corrugations, such as are shown in U.S. Pat. Nos. 4,576,800 and 3,183,963. Corrugations are preferred to the indentations, because of the relative difficulty in placing indentations on opposite sides of the strip, and in precisely locating each indentation. The corrugations in adjacent layers of the strip are oriented in different directions, as shown in the cited patents, so that the corrugations in adjacent layers of the strip cannot coincide and nest together.

Figure 1:
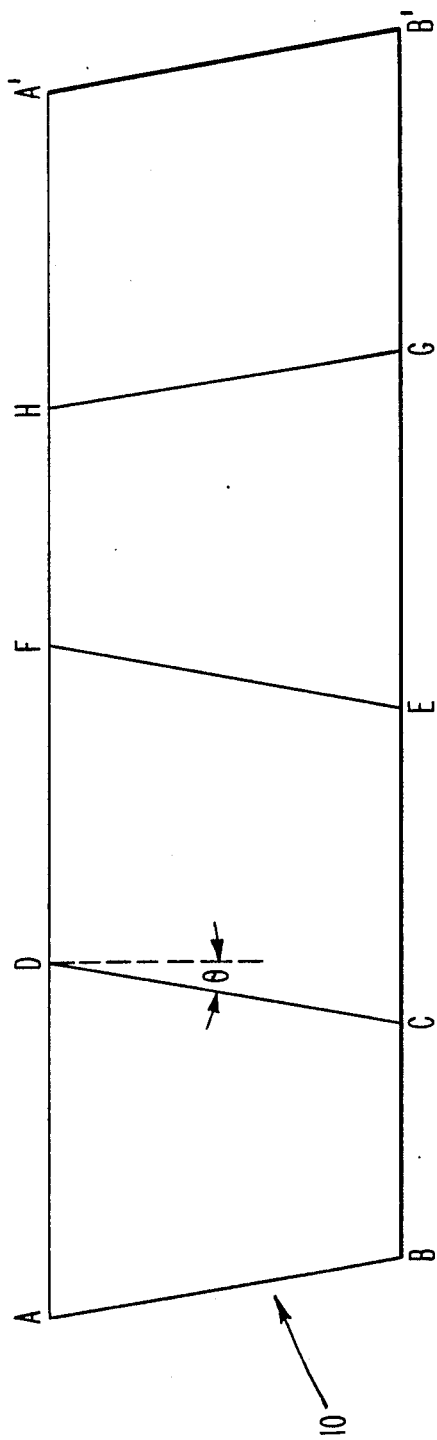
FIG. 1 is a plan view of a strip which is ready to be folded along crease lines extending across the width of the strip.

FIG. 1 shows a plan view of a strip of metal 10, ready to be folded along the folding lines AB, CD, EF, and GH. These lines are all inclined to the perpendicular to the axis of the strip by the angle $\theta$. The angle $\theta$ is an acute angle. The repeating sequence of the inclinations is left, right, right, left. In FIG. 1, A' and B' denote the next points A and B, i.e. the points in the next cycle of folding lines.

Strip 10 of FIG. 1 is folded as follows. One starts with the trapezoid ABCD. The strip is then folded along the line CD, so that the parallelogram FECD is folded over trapezoid ABCD. Next, the strip is folded along the line EF, so that trapezoid FEGH is folded over parallelogram FECD. Then, the strip is folded along the line GH, so that parallelogram GHA'B' is folded over trapezoid FEGH. After this last fold, points A' and B' fall directly over points A and B. The cycle of folding is then repeated.

The distance DF is chosen such that, when parallelogram FECD is folded over trapezoid ABCD, point F lies directly above point B (i.e. line AD is perpendicular to line BF). Similarly, point H lies directly above point C. When these relationships hold, the result of folding the strip is as shown in FIG. 2.

Figure 2:
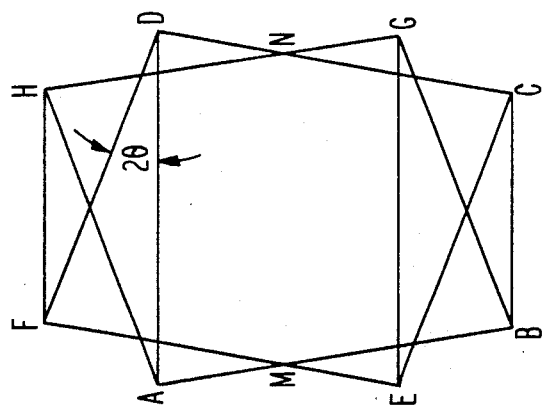
FIG. 2 is a diagram showing the strip of FIG. 1 folded along the crease lines.

FIG. 2 shows the strip which has been folded through one cycle, as described above. The shape of the starting trapezoid ABCD, plus the requirement that distance DF be chosed as described above, determine the shape of the entire structure. The shape of the structure is thus determined by the angle $\theta$, and by the spacing between adjacent folding lines.

The taper that anchors the honeycomb in its canister is defined by the broken lines AME and DNG. Point M is defined as the point of intersection of lines AB and FE, when FIG. 2 is viewed in two dimensions. Similarly, N is the point of intersection of lines CD and GH. As the angle $\theta$ approaches zero, trapezoid ABCD turns into a rectangle, and the taper disappears.

If the spacings between the lines AB, CD, EF, and GH remain constant as the folding proceeds, the configuration in FIG. 2 will be reproduced over and over. The resulting honeycomb will have straight sides perpendicular to the plane of the paper. But by gradually varying the spacing between the folding lines, from one fold to the next, one can produce a honeycomb having a wide variety of cross-sectional shapes. The distance between successive fold lines determines the length of the chord of the folded honeycomb. The term "chord", as used herein, means one layer of the strip between folds; the length of one such chord is indicated as "D" in FIG. 6. By varying the length of the chord from one fold to the next, it is possible to make a folded strip which assumes the desired cross-sectional shape.

Figure 4:
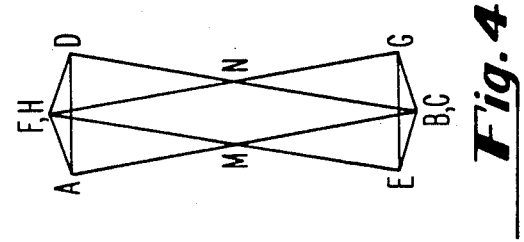
FIG. 4 is a diagram similar to FIGS. 2 and 3, wherein lines AB and CD have been moved together until points B and C coincide.
Figure 3:
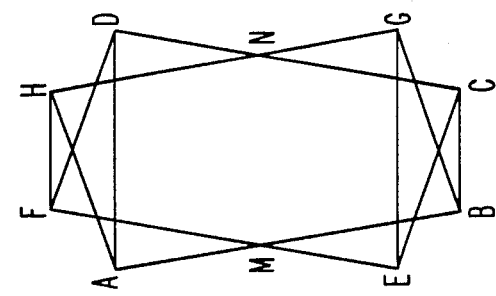
FIG. 3 is a diagram similar to FIG. 2, but with lines AB and CD moved closer together.

FIG. 3 and 4 show what happens when lines AB and CD are moved closer together. FIG. 3 was constructed in the same way as was FIG. 2, but with lines AB and CD moved closer together. Angle $\theta$ remained unchanged. The result is a reduction in the length of the chord of the folded honeycomb. In FIG. 4, lines AB and CD have been moved together until points B and C coincide, and the chord length of the catalytic converter is at its minimum.

Figure 6:
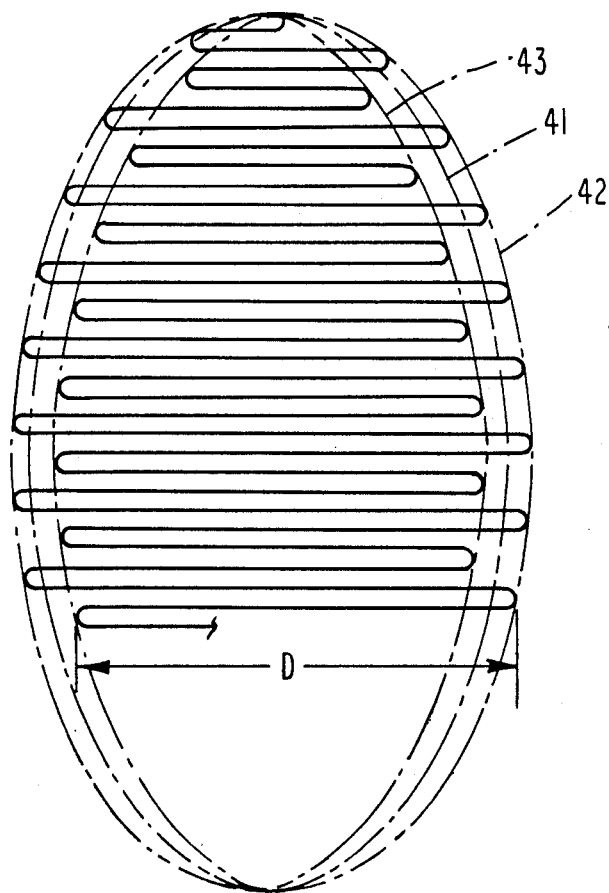
FIG. 6 is a fragmentary end view of a honeycomb catalyst support made by folding a strip, to form a generally elliptical cross-section.

As the spacing between fold lines is varied, the length of the chord of the folded strip changes for different folds. FIG. 6, for example, shows a strip which has been folded into an elliptical cross-section. Other cross-sections, such as circles, squares, and other shapes, can be produced by varying the spacing between fold lines.

The folded strip is held within a canister, one purpose of which is to hold the layers in place, and to prevent them from telescoping outwardly. An example of such a canister is shown in the exploded perspective view of FIG. 9. The canister can itself be formed from a metal strip.

It is apparent, from the following discussion, and from the figures, that the width of the strip from which the canister is made need be no greater than the width of the strip that is being folded. When the spacing between adjacent fold lines is decreased, the distance between lines AD and EG, in FIGS. 2, 3, or 4, increases. But in the limiting case of FIG. 4, this distance is still less than the width of the strip which is being folded. Also, as the spacing between adjacent fold lines is decreased, the distance between lines FH and BC decreases, but it too never reaches the width of the strip being folded. Although there will always be a part of the honeycomb protruding beyong the width of the canister, the width of the strip from which the canister is made need be no greater than the width of the strip that is being folded, in order to hold the folded strip in place. The portions of the folded converter which protrude beyond the width of the original strip can be enclosed within transition pieces, such as will be described below.

Figure 5:
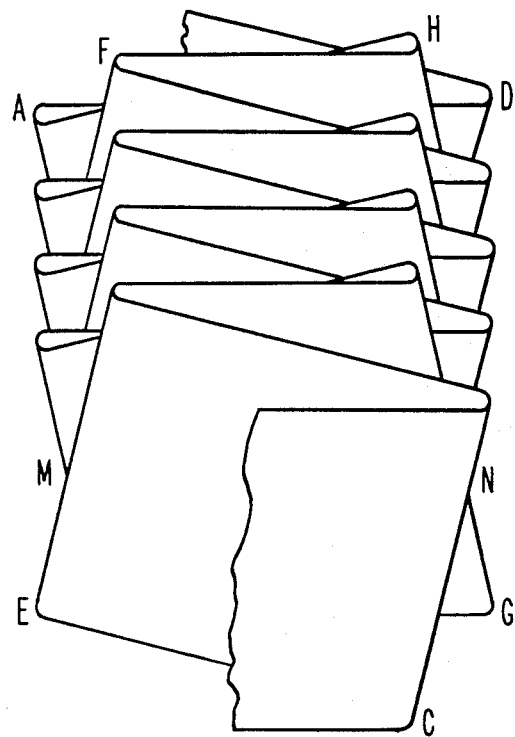
FIG. 5 is a perspective view of a strip of metal folded back and forth upon itself.

FIG. 5 is a perspective view of a strip folded back and forth upon itself. The angle $\theta$ is the same as in FIGS. 1-4 and the dimensions are the same as in FIGS. 1 and 2. The main point of FIG. 5 is to show, in three dimensions, the double taper, which reverses its direction at points M and N. For clarity, the spacing between the layers is greater than it would be in practice, and no corrugations are shown.

FIG. 6 is a fragmentary end view of a honeycomb catalyst support made by folding a corrugated strip. The dotted line 41 in FIG. 6 indicates the locus of the points M and N in FIGS. 2, 3, 4, and 5. These points lie at the waist of the honeycomb where the taper changes its direction. Dotted line 42 indicates the locus of points A, D, E, and G that lie at the maximum width of the taper. Dotted line 43 indicates the locus of points F, H, B, and C that lie at the minimum width of the taper.

Figure 7:
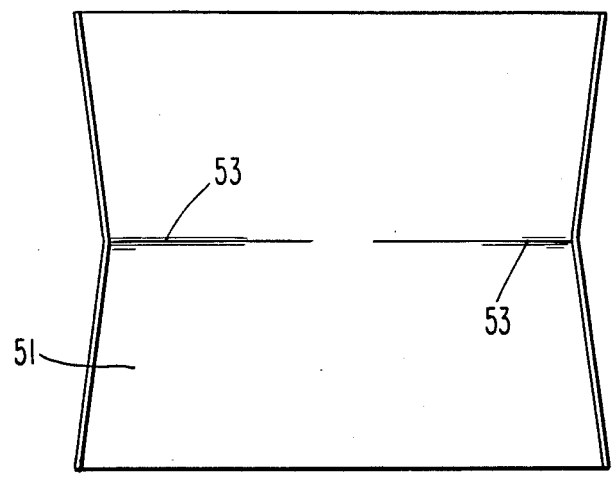
FIG. 7 is a view of the canister of FIG. 8, taken along the line 7—7 of FIG. 8.
Figure 8:
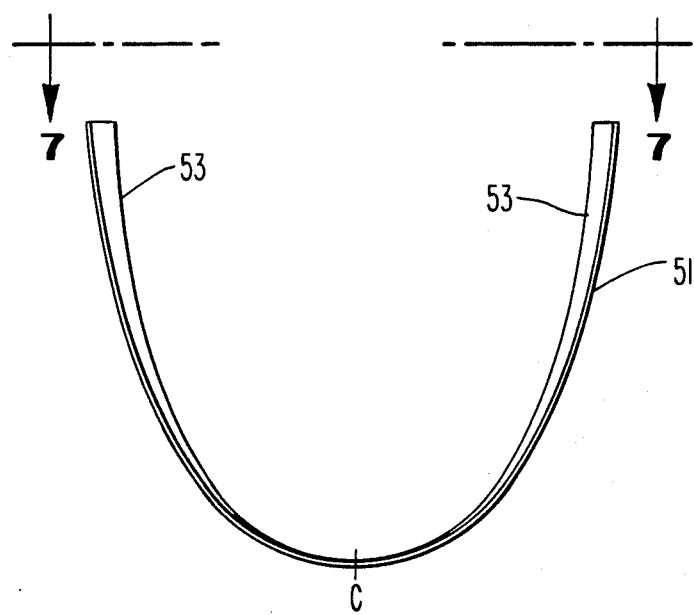
FIG. 8 is an end view of the canister used to enclose the folded strip which forms the catalytic converter.

The canister used to hold the honeycomb catalyst support is illustrated in FIGS. 7, 8 and 9. FIG. 9 is an exploded perspective view showing honeycomb catalyst support 50 made by folding a corrugated strip. For the sake of clarity, no corrugations are shown on the folded strip of FIG. 9.

FIG. 9 also shows in perspective two sections 51 and 52 which define a canister for holding the catalyst support. The canister sections 51 and 52 have a waist line 53 that will mate with the waist line on the catalyst support 50. In FIG. 9 the canister sections 51 and 52 are about to be clamped together around the honeycomb. The layers of the honeycomb will be compressed together as they must be to obtain a rigid honeycomb that will remain firmly anchored. After the canister sections are wrapped around the honeycomb, the sections are welded together along lines FF.

The structure of one of the canister sections 51 is further illustrated in FIGS. 7 and 8. The waistline 53 is plainly shown in the view of FIG. 7, in which the canister section is seen from line 7—7 of FIG. 8. FIG. 8 is an end view which illustrates the gradual decrease of the depth of waistline 53, towards the interior of canister section 51. At or before point C, the depth disappears entirely. This gradual decrease of depth matches the gradual approach of lines 41 and 42 in FIG. 6. The absence of any depth at point C, at the bend in the canister section, makes the canister section flexible so that it can be opened slightly to receive the honeycomb catalyst support. The canister therefore comprises a means for anchoring the honeycomb, by providing a structure having a contour which generally coincides with that of the honeycomb.

FIG. 10 is a perspective view of the completed catalytic converter made according to the present invention. The canister sections 51 and 52 have been welded together to form a single canister, and transition pieces 60 have been welded onto each end of the canister. As is shown, transition pieces 60 comprise a union of frusto-conical and cylindrical sections. In FIG. 10, the frusto-conical portion of only one of the transition pieces 60 is visible. The portion of the honeycomb which has been described as protruding beyond the length of the canister is located within the frusto-conical portion of the transition pieces.

Transition pieces 60 can also be formed as extensions of the canister sections 51 and 52. Then the converter shell would comprise just two metal stampings. The stampings would be welded together along line 65 in FIG. 10. In an alternative embodiment, the stampings could be constructed as one piece, having one seam permitting the shell to be opened and then closed around the catalyst support. The shell would then be welded along its one seam.

Figure 11:
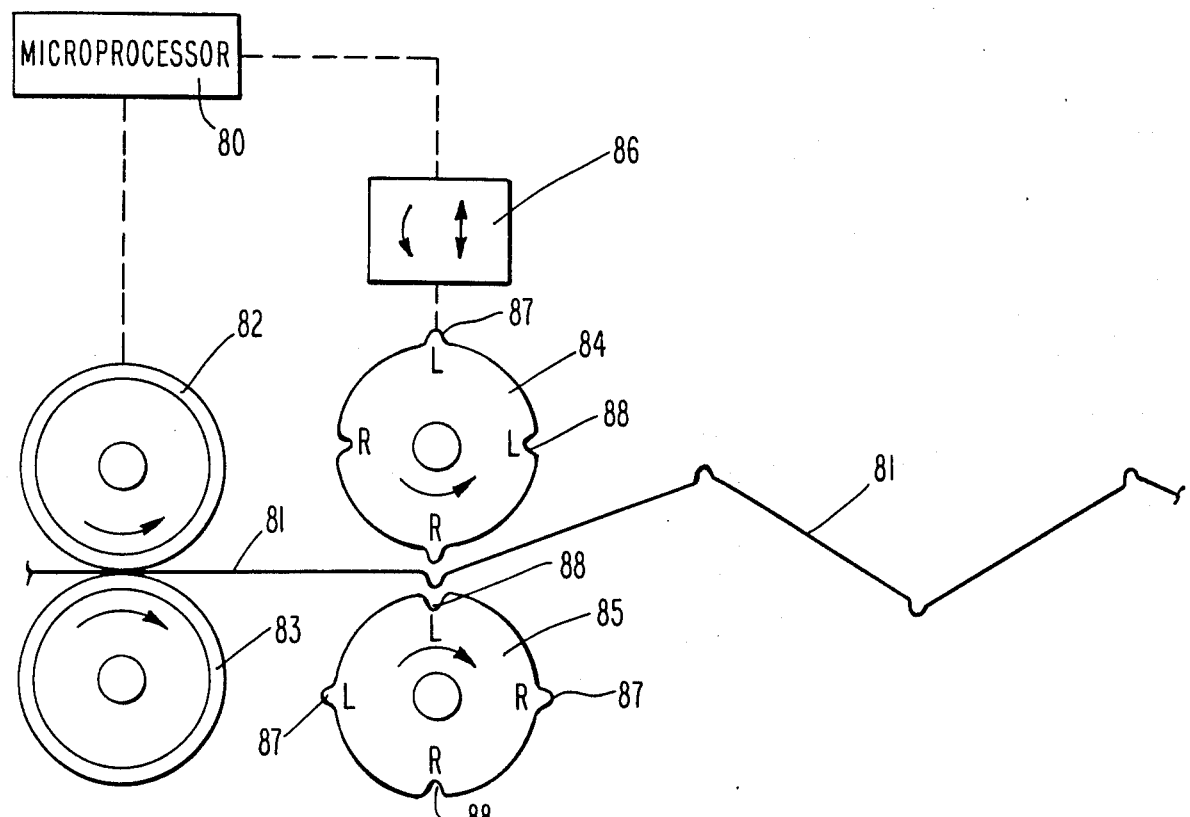
FIG. 11 is a schematic diagram showing the creasing of a metal strip by a pair of creasing rollers, controlled by a microprocessor.

FIG. 11 is a schematic diagram which includes a pair of creasing rollers 84 and 85, showing a metal strip 81 being creased by these rollers. The rollers have ridges and grooves which are not parallel to the axes of the rollers, but which instead define spirals on the surfaces of the rollers.

When the rollers are pressed against the strip, the spiral ridges and grooves form the inclined creases indicated in FIG. 1. In FIG. 11, letters R and L designate right and left hand spirals on the rollers. A right hand spiral on one roller must mate with a left hand spiral on the other roller. The creases occur in the sequence RR-LL-RR-LL, etc., as shown in FIG. 1.

Note that each roller has one right hand and one left hand ridge, and one right hand and one left hand groove, and this is the minimum number of each.

FIG. 11 also shows a scheme for controlling the spacing of the crease lines along the length of the strip. The corrugated strip 81 is being fed continuously by feed rollers 82 and 82, which are coated with rubber so that they do not flatten the corrugations. Microprocessor 80 has stored in its memory a predetermined sequence of numbers representing the intervals between adjacent crease lines. By properly choosing these intervals, one can form creases at the locations necessary to produce a strip which can be folded into a catalyst support of the desired cross-section. Of course, if the honeycomb has the cross-section of a circle or an ellipse, the spacing between the crease lines will change from one fold to the next.

Microprocessor 80 monitors the number of revolutions made by feed rollers 82 and 83, which is proportional to the total length of strip passed through the rollers. Microprocessor 80 also receives continuously the speed of feed rollers 82 and 83, which speed is proportional to the linear speed of strip 81.

The output of microprocessor 80 is connected to controller 86 which controls the speed and the opening and closing of creasing rollers 84 and 85. The creasing rollers are made to close upon strip 81 only during those short intervals when a crease is being formed. During these intervals, the linear speed of the periphery of creasing rollers 84 and 85 must be equal to the linear speed of strip 81, which speed is generally constant. The creasing rollers always turn one-fourth of a revolution between successive creases. However, after creasing the strip, the speed of rollers 84 and 85 is, in general, immediately altered by controller 86, so that the strip will be creased in the correct place when the rollers have moved through the next quarter-revolution.

Near the ends of a strip which is to be folded into a circular or elliptical cross-section, the crease lines are spaced at short intervals, which can be shorter than one-fourth of the circumference of the creasing rollers. In this case, the speed of the creasing rollers would be increased between creases, and then reduced to match the speed of the strip when the rollers close upon the strip to form a crease. Near the middle of the strip, where the crease lines are spaced at wider intervals, the opposite would be true. In this case, the speed of the rollers would be reduced after creasing, and would be increased to match the speed of the strip when the rollers again close upon the strip. In general, the creasing rollers are always in motion, whether or not they are in engagement with the strip.

Figure 12:
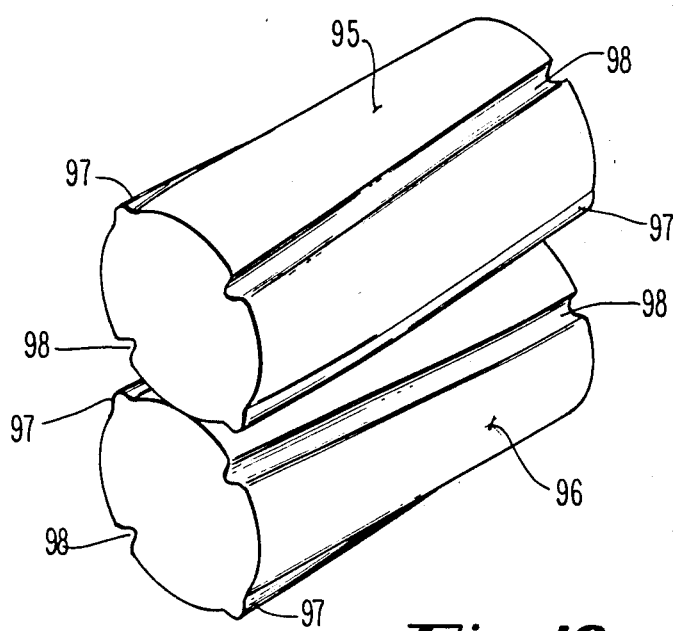
FIG. 12 is a perspective view of a pair of creasing rollers, showing grooves and ridges for creasing.

FIG. 12 is a perspective view of a pair of rollers which can be used to form the creases. The figure shows spiral grooves 98 and ridges 97 that are disposed to mate with each other. As stated above, the grooves and ridges are formed as spirals so that the creases impressed into the metal strip, by the revolving rollers, will be straight. The angle of twist of the spirals on the rollers can be determined by "wrapping" the strip of FIG. 1 around a cylinder representing a roller. The spirals are fully determined by the angle $\theta$ and the radius of the roller.

Instead of having the ridges and indentations, as shown in FIGS. 11 and 12, the roller on one side of the strip can have ridges, and the roller on the other side of the strip can have pads of rubber. As the rollers are compressed around the strip, the ridge on one roller forces the strip into the rubber pad on the opposite roller, and thereby creases the strip as desired.

It is understood that the invention can be modified in many ways. The folding lines in the metal strip can be produced using different techniques. Different corrugating means can be used to keep adjacent layers of the strip apart. As stated above, the canister structure, and the structure of the transition pieces, can also be changed. The control of the creasing of the strip can be accomplished by means other than a microprocessor, such as an electromechanical device. These and other modifications are to be considered within the spirit and scope of the following claims.

What is claimed is:

1. A method of making a catalytic converter for an automobile, comprising the steps of:
    (a) forming crease lines across the width of a metal strip, the crease lines being inclined from the perpendicular to the longitudinal axis of the strip, the inclinations forming the repeating sequence left, right, right, left, etc.,
    (b) folding the strip back and forth upon the crease lines, so that the folded strip has a taper in both of two directions, and
    (c) enclosing the folded strip in an anchoring means.

2. The method of claim 1, wherein the folded strip has a taper, and wherein the anchoring means has a taper that coincides with the shape of the taper of the folded strip.

3. The method of claim 1, further comprising the step of corrugating the metal strip.

4. The method of claim 3, wherein the corrugating step is performed such that the corrugations in adjacent layers of the strip are oriented in different directions, so that the corrugations in adjacent layers of the strip cannot coincide and nest together.

5. The method of claim 1, further comprising the step of coating the converter with a catalyst.

6. The method of claim 1, further comprising the step of affixing a pair of transition pieces to the input and output end of the converter.

* * * * *